(No Model.) 2 Sheets—Sheet 1.
F. H. MERRILL.
LIQUID RAISING APPARATUS.
No. 533,226. Patented Jan. 29, 1895.
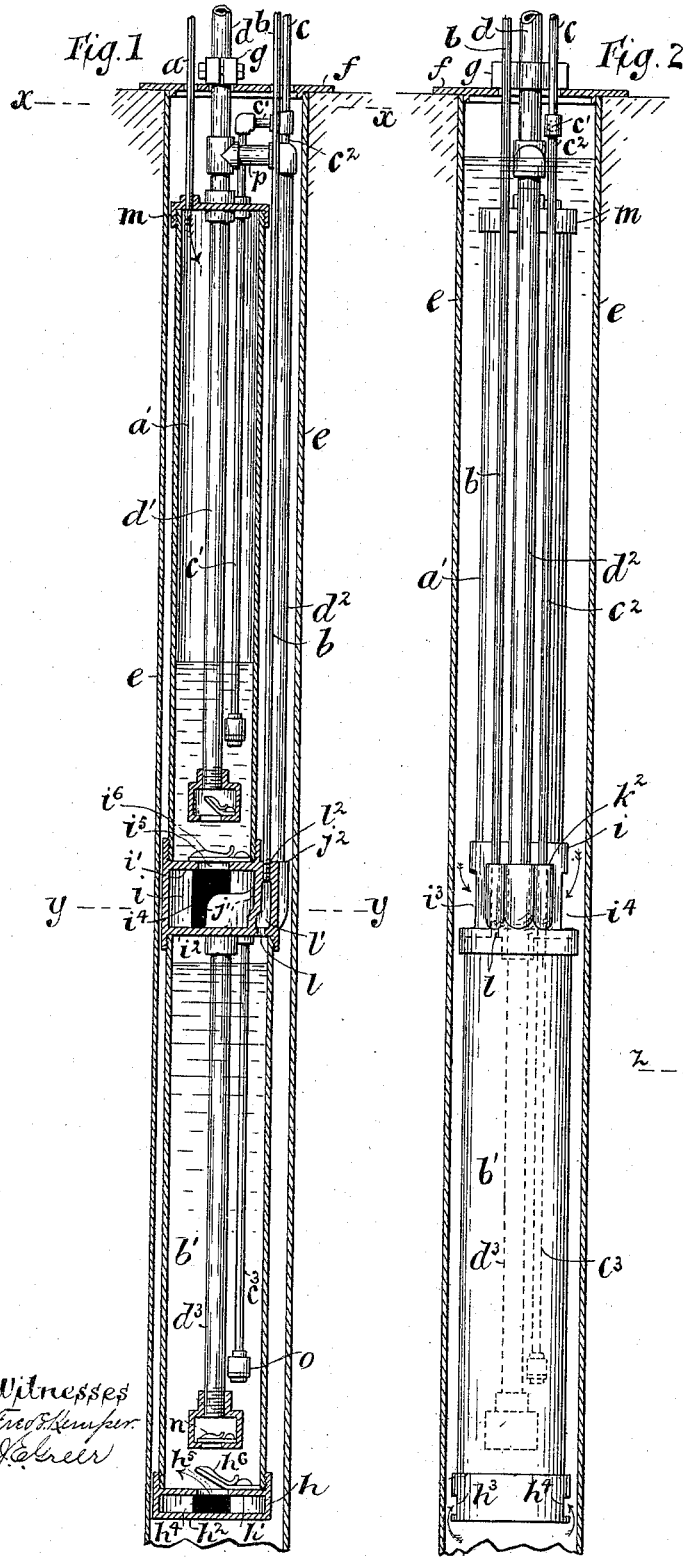
Witnesses
Fred E Kemper
J E Greer
Inventor
Frank H. Merrill
by Gifford & Saw
Attorneys (No Model.) 2 Sheets—Sheet 2.

F. H. MERRILL.
LIQUID RAISING APPARATUS.

No. 533,226. Patented Jan. 29, 1895.

Witnesses
Fred O. Kemper
J. C. Greer

Inventor
Frank H. Merrill
by Gifford Law
Attorneys

UNITED STATES PATENT OFFICE.

FRANK H. MERRILL, OF BOUND BROOK, NEW JERSEY, ASSIGNOR TO THE MERRILL MANUFACTURING COMPANY, OF NEW JERSEY.

LIQUID-RAISING APPARATUS.

SPECIFICATION forming part of Letters Patent No. 533,226, dated January 29, 1895.

Application filed July 16, 1891. Serial No. 399,698. (No model.)

*To all whom it may concern:*

Be it known that I, FRANK H. MERRILL, of Bound Brook, in the State of New Jersey, have invented a new and useful Improvement in Liquid-Raising Apparatus, of which the following is a specification.

My present invention is an additional step in the line of improvement to which relate Letters Patent of the United States No. 403,125, dated May 14, 1889; also my application for Letters Patent filed January 15, 1890, Serial No. 337,009; also my application for Letters Patent filed July 13, 1891, Serial No. 399,287.

My present invention consists of means whereby the system of liquid raising to which these various patents relate is adapted for use in a well of small diameter, as for instance in a bored well. I have constructed and combined in said system a water compartment containing several novel features not only adapting it for use in a bored well, but also facilitating its construction and the accessibility of the interior parts for repairs and in course of construction.

Figure 6:
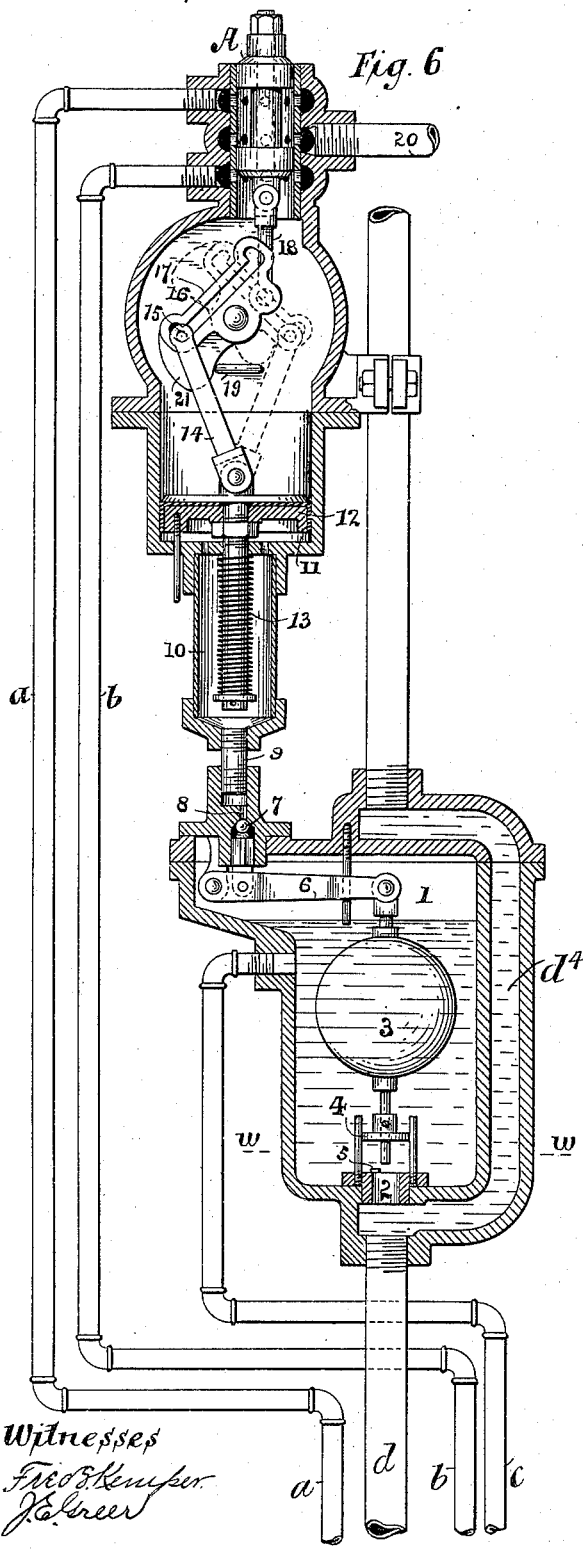
Figure 7:
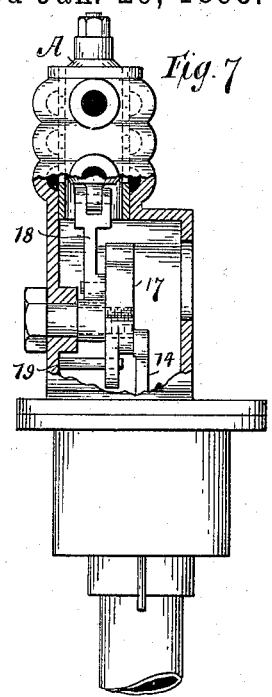
Figure 8:
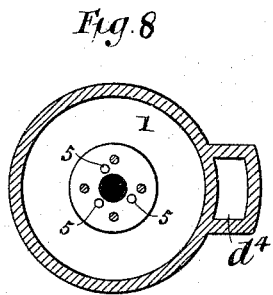

In the accompanying drawings, Figures 1 to 5 inclusive represent the parts of the apparatus within the well, of which Fig. 1 is a vertical section on the line $z\,z$ of Fig. 4. Fig. 2 is a side view. Fig. 3 is a horizontal section on the line $x\,x$ of Fig. 1. Fig. 4 is a horizontal section on the line $y\,y$ of Fig. 1. Fig 5 is a sectional detail of the valves at the bottoms of the pipes through which air passes out of the water compartments to move the main valve. Figs. 6, 7 and 8 represent the apparatus outside of the well, Fig. 6 being a vertical section thereof, Fig. 7 a side view of a portion thereof, and Fig. 8 a cross section on the line $w\,w$.

An apparatus corresponding with that portion hereof which is located outside of the well is the subject of said last named application and is therefore not claimed herein excepting in combination, and need not be described with great detail.

$a$ is the pipe by which the compressed air is conducted from the main valve A to one of the water compartments $a'$.

$b$ is the pipe by which the compressed air is conducted from the main valve A to the other water compartment $b'$.

$c$ is the pipe by which the compressed air is conducted to the valve operating mechanism from the pipe $c'$ leading from the water compartment $a'$ and the pipe $c^2$ leading from the water compartment $b'$.

$d$ is the water delivery pipe which is connected with the pipe $d'$ leading from the water compartment $a'$ and the pipe $d^2$ leading from the water compartment $b'$.

$e$ represents the walls or sides of the well which will sometimes be composed of a pipe or at other times be composed of the rock or other substance through which the well is bored.

$f$ is the cover of the well from which the parts within the same are suspended by means of a clamp $g$ screwed upon the water delivery pipe $d$ at any position which may be required, depending upon the depth of the well or the height of the water therein.

The water compartments $a'$ and $b'$ are arranged one above the other, and each consists of a tube of a diameter permitted by the size of the well. In the drawings the tube or compartment $a'$ is shown as of less diameter than the tube or compartment $b'$, and this I prefer because it enables the pipes leading to and from the compartment $b'$ to pass by the compartment $a'$ the more readily. Being of less diameter the compartment $a'$ is proportionately longer to provide for substantially the same cubical contents.

Upon the lower end of the tube composing the sides of the compartment $b'$ is screwed a cap $h$ which is composed of two thicknesses $h'$ and $h^2$ having a chamber between them as shown in Fig. 1, which chamber is provided with side inlet openings $h^3$ and $h^4$. The advantage of having these inlet openings at the sides rather than on the bottom is, that they are less liable to be obstructed by any object floating upon the water within the well. The upper thickness $h'$ is provided with the opening $h^5$ closed by the valve $h^6$.

$i$ is a double fitting, the bottom of which is screw threaded onto the top of the compartment $b'$ and the top of which is screw threaded onto the bottom of the compartment $a'$. This fitting $i$ is also made of two thicknesses $i'$ and $i^2$ between which is a chamber provided with the side inlet openings $i^3$ and $i^4$ through which the water enters to the opening $i^5$ in the thickness $i'$ which is controlled by the valve $i^6$. The lower thickness of the fitting $i$ is perforated by the openings $j$, $k$ and $l$ which connect by channels $j'$, $k'$ and $l'$ cast in the fitting $i$ with openings at $j^2$, $k^2$ and $l^2$ in the top of the fitting $i$ but outside of the base of the compartment $a'$. $m$ is the cap of the compartment $a'$ to the top of which it is screw threaded, and this cap is provided with suitable openings for the passage through it of the pipes $a$, $d$ and $c'$ which are screw threaded thereto. $d^3$ is the water delivery pipe for the compartment $b'$ which is screw threaded to the fitting $i$ at the opening $j$ and which extends down to near the bottom of the compartment $b'$ and is provided at its bottom with a check valve $n$.

$c^3$ is a pipe by which the compressed air which is to operate the main valve A leaves the compartment $b'$. This pipe is screw threaded to the fitting $i$ at the opening $k$ and extends down toward the bottom of the compartment $b'$ but not to as low a level as does the water delivery pipe $d^3$. The pipe $c^3$ is provided at its lower end with a check valve $o$ of the construction shown in Fig. 5.

The water delivery pipe $d^2$ is screw threaded to the top of the fitting $i$ at the opening $j^2$ and therefore it, together with the channel $j'$ and the water delivery pipe $d^3$, constitutes a continuous passage for the water from the bottom of the compartment $b'$ up through the well past the compartment $a'$ until it connects with the main water delivery pipe $d$ by the cross pipe $p$.

The compressed air pipe $b$ is screw threaded into the top of the fitting $i$ at the opening $l^2$ and therefore, together with the channel $l'$ and the opening $l$, constitutes a direct connection between the main valve A and the top of the water compartment $b'$.

The pipe $c^2$ is screw threaded into the top of the fitting $i$ at the opening $k^2$ and therefore, together with the channel $k'$ and the pipe $c^3$, constitutes a continuous passage from near the bottom of the compartment $b'$ to the pipe $c$ leading to the auxiliary chamber shown in Fig. 6.

The pipes $c'$ and $d'$ within the compartment $a'$ are screw threaded to the cap $m$ of that compartment and lead down to near the bottom thereof; the latter leading however, to a lower level than the former. They are provided with valves similar to those described for the corresponding pipes in the compartment $b'$.

Now it will be observed, that not only does the construction of the parts within the well enable them to successfully perform the functions hereinafter attributed to them in describing the mode of operation, but, while being economical in construction, they may be readily united and disunited, not only in the first construction of the apparatus, but also in gaining access to the valves of the same as may be required in practical use. Thus, the removal of the cap $m$ carries with it the pipes $c'$ and $d'$ and the valves located therein. The removal of the fitting $i$ carries with it, not only the valves at the bottom of the compartment $a'$, but the pipes $c^3$ and $d^3$ within the compartment $b'$ and their respective valves; also the removal of the cap $h$ carries with it the valve at the bottom of the compartment $b'$.

The pipe $c$ connects with an auxiliary chamber 1 which is connected at its bottom with the continuation $d^4$ of the water delivery pipe by an opening 2.

3 is a float carrying at its bottom a valve 4 which nearly closes the opening 2 when the float is down, being prevented from wholly closing it by studs 5. This float is suspended from a lever 6 to which is secured a valve 7 closing a passage-way 8 which leads from the auxiliary chamber 1 into the succession of passages 9, 10 and 11; the latter being immediately beneath the piston 12. The stem of this piston is provided with a coil spring 13 which constantly tends to hold the piston in the position shown in Fig. 6 against any action tending to raise it.

14 is a link pivoted to the piston and provided at its upper end with a pin 15 which runs in the slot 16 of the tilting lever 17, which lever is in turn pivotally connected with the main valve A by the link 18.

19 is a stop which limits the movement of the tilting lever 17 in each direction.

20 is the pipe by which the compressed air is supplied to the main valve.

The operation of the apparatus is as follows: When the parts are in the position shown in Figs. 1 and 6, the compressed air, being supplied by the pipe 20, is directed by the main valve into the pipe $a$ so as to force whatever water is contained within the compartment $a'$ therefrom through the water delivery pipe $d'$ and in some cases also, through the pipe $c'$. In the meantime, the pipe $b$ connects with the open air and therefore no substantial pressure exists in compartment $b'$ and the water fills the same. When the compressed air has forced the water within the compartment $a'$ below the level of the bottom of the pipe $c'$, it will pass out through said pipe $c'$ and enter the auxiliary chamber 1 through the pipe $c$; being prevented from entering the compartment $b'$ by the check valve $o$. This compressed air will continue to enter the auxiliary compartment 1 until it has forced the water through the passage 2 therefrom sufficiently to cause the float 3 to drop, whereupon the valve 7 will be opened and the air will pass upward into the chamber 11 beneath the piston 12 where it will exert sufficient power to overcome the spring 13 and force the piston upward and tilt the lever 16 from the position shown in full lines, Fig. 6, to the position shown in dotted lines, thus carrying the main valve to the opposite end of its stroke and causing the communication of the pipe $a$ with the open air and of the pipe $b$ with the compressed air supply from pipe 20. The lever 16 is provided with a weight 21 which acts as a counterpoise for the weight of the main valve A on the opposite side of the fulcrum. The compressed air from the pipe $b$ will now produce a corresponding operation in the compartment $b'$, and as it is going on the compartment $a'$ will be again filling with water because of the removal of the pressure from the pipe $a$. In this manner the pressure of the compressed air will be applied alternately in the compartments $a'$ and $b'$ and the float 3 will determine when the forcing of the water out of each compartment is substantially completed and will therefore admit the compressed air to the piston 12 in such manner as to shift the main valve A.

I do not desire to limit myself to the details of construction shown, since I believe that in details the apparatus may be varied to a very large extent without departing from the scope of my invention.

I have referred to the members closing the ends of the tubular compartments as caps, but, obviously, plugs would be equivalents.

I claim—

1. As an article of manufacture, two compressed air water compartments constructed of tubes arranged end to end provided with an opening intermediate the two tubes for the entrance of water, an opening at the bottom of the lower tube also for the entrance of water and openings at the top of each tube for the entrance of compressed air and the escape of water, substantially as described.

2. In combination the compressed air supply pipe $a$, the water escape pipe $d$, the compressed air escape pipe $c'$, the compartment $a'$ with which all of said pipes connect, the compressed air supply pipe $b$, the water escape pipe $d^2$, the compressed air escape pipe $c^2$, the water compartment $b'$ with which the three last named pipes connect; the said three last named pipes extending longitudinally alongside the compartment $a'$ and the compartment $b'$ being arranged below the compartment $a'$, substantially as described.

3. In a pneumatic pump, in combination, two tubes placed end to end, a coupling cutting off communication between them and provided with a passage leading from the one tube to a lateral opening and another passage leading from a lateral opening to the other tube, a cap provided with a valved inlet opening for the opposite end of one tube and a cap provided with outlet and inlet openings for the opposite end of the other tube, substantially as described.

4. In combination, two tubes, a coupling provided with a partition cutting off communication between them, caps at the opposite extremities of the two tubes, gas and water pipes leading inside of the upper tube and gas and water pipes extending downward alongside of the upper tube and through the coupling into the lower tube whereby the coupling is disconnected from the pipes extending through the cap of the upper tube, substantially as described.

FRANK H. MERRILL.

Witnesses:
J. E. GREER,
FRED S. KEMPER.